United States Patent
Hucker

(12) 
(10) Patent No.: US 11,512,516 B2
(45) Date of Patent: Nov. 29, 2022

(54) BRAKING DEVICE FOR A MOVABLE DOOR LEAF AND DOOR CLOSER HAVING SUCH A BRAKING DEVICE

(71) Applicant: Geze GmbH, Leonberg (DE)

(72) Inventor: Matthias Hucker, Marxzell (DE)

(73) Assignee: GEZE GMBH, Leonberg (DE)

( * ) Notice: Subject to any disclaimer, the term of this patent is extended or adjusted under 35 U.S.C. 154(b) by 1003 days.

(21) Appl. No.: 16/238,304

(22) Filed: Jan. 2, 2019

(65) Prior Publication Data
US 2019/0218844 A1 Jul. 18, 2019

(30) Foreign Application Priority Data
Jan. 17, 2018 (DE) .................. 102018200730.6

(51) Int. Cl.
| | | |
|---|---|---|
| *E05F 15/63* | (2015.01) | |
| *E05F 5/08* | (2006.01) | |
| *E05F 5/02* | (2006.01) | |
| *E05F 3/00* | (2006.01) | |
| *H02P 3/14* | (2006.01) | |

(52) U.S. Cl.
CPC .................. *E05F 5/08* (2013.01); *E05F 3/00* (2013.01); *E05F 5/027* (2013.01); *E05F 15/63* (2015.01); *E05F 2015/631* (2015.01); *E05Y 2201/21* (2013.01); *E05Y 2400/302* (2013.01); *H02P 3/14* (2013.01)

(58) Field of Classification Search
CPC ..... E05F 15/63; E05F 3/00; E05F 5/08; E05F 5/02; E05F 11/54
See application file for complete search history.

(56) References Cited

U.S. PATENT DOCUMENTS

| | | | | |
|---|---|---|---|---|
| 7,571,515 B2* | 8/2009 | Fischbach | ............... | E05F 15/42 |
| | | | | 49/342 |
| 9,501,047 B2* | 11/2016 | Salutzki | .................. | E05F 15/63 |
| 10,236,801 B2* | 3/2019 | Dye | ...................... | E05F 15/619 |
| 10,316,567 B2* | 6/2019 | Worner | .................. | H02K 7/116 |

(Continued)

FOREIGN PATENT DOCUMENTS

| | | | |
|---|---|---|---|
| DE | 265375 A | 8/1912 | |
| DE | 646749 A | 6/1937 | |

(Continued)

*Primary Examiner* — Thai T Dinh

(74) *Attorney, Agent, or Firm* — Dennemeyer & Associates; Steven M. Shape

(57) ABSTRACT

A braking device for a movable door leaf comprises an electric braking motor to damp movement of the door leaf; a motor shaft coupleable with an axis of rotation of the door leaf; and a control unit to control the electric braking motor. A generator provides power to the control unit. A continuously variable transmission unit between the axis of rotation of the door leaf and either the motor shaft of the electric braking motor or the separate generator is controlled by a mechanical control such that the motor shaft of the electric braking motor and/or the separate generator, can be driven at a rotational speed independent of the rotational speed of the rotational axle of the door leaf. Also included is a door closer, having a rotatable door closer axis, coupleable with a door leaf, cooperating with a mechanical energy storage device, and a correspondingly designed braking device.

19 Claims, 6 Drawing Sheets

(56) References Cited

U.S. PATENT DOCUMENTS 10,781,620 B2 *  9/2020  Hucker ............... G01M 99/008
2011/0252598 A1 * 10/2011  Burris .................... E05F 3/227
                                                       16/62

FOREIGN PATENT DOCUMENTS

DE      102011055491 A1    5/2013
DE      102015200284 B3   10/2015

* cited by examiner

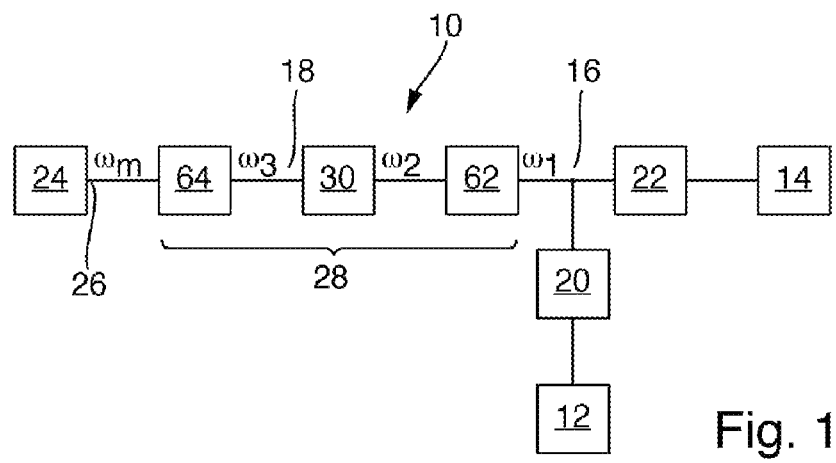
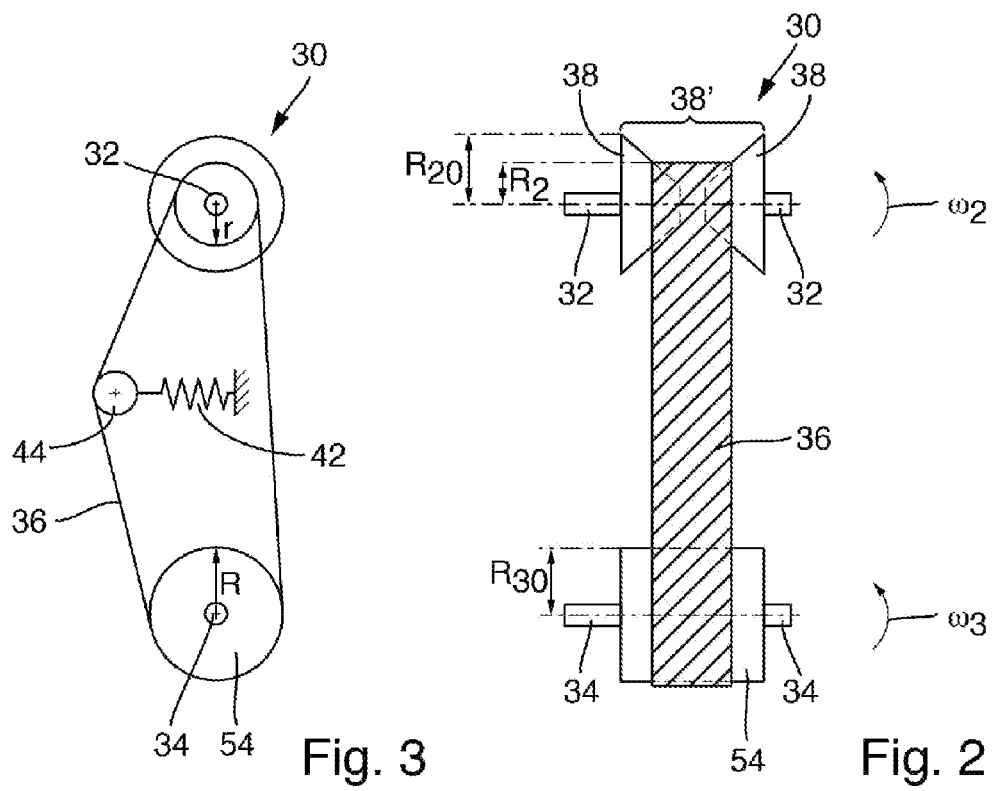

Fig. 7a)  Fig. 7b)
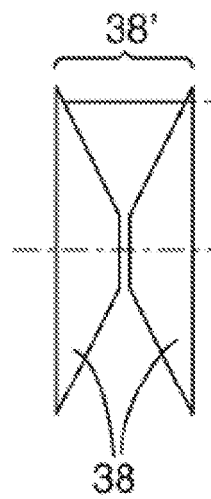
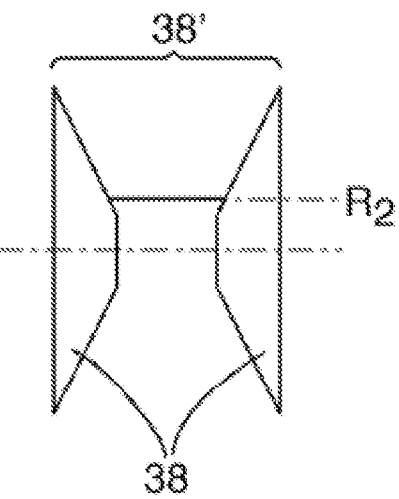
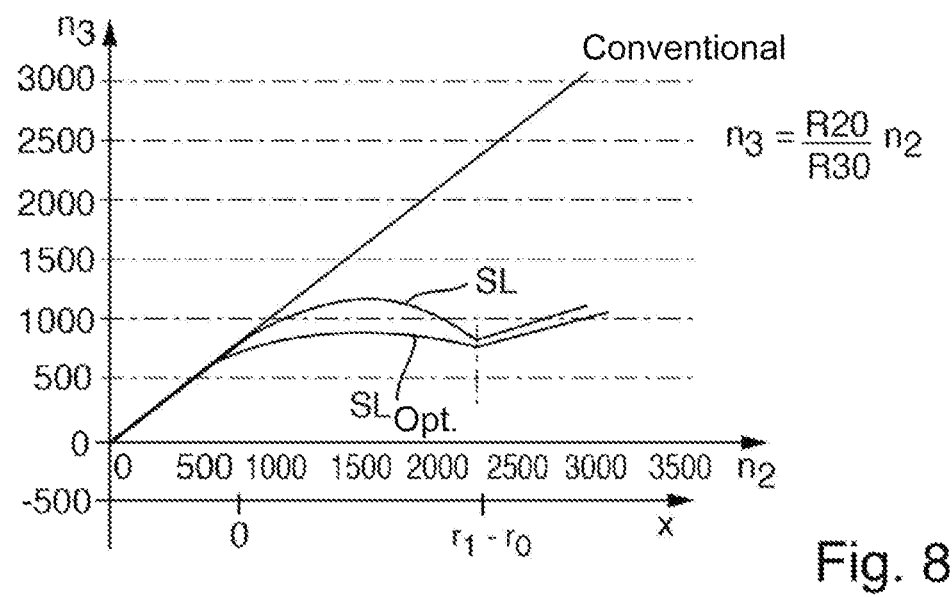
Fig. 8

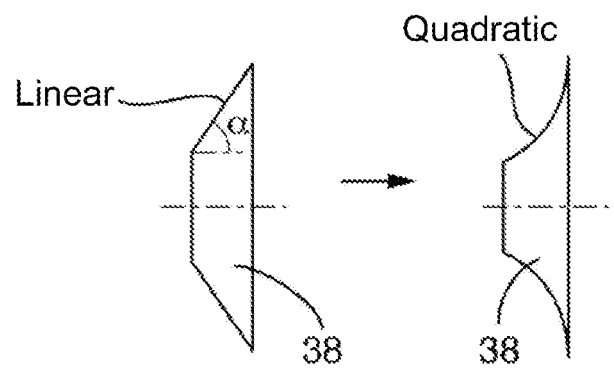

BRAKING DEVICE FOR A MOVABLE DOOR LEAF AND DOOR CLOSER HAVING SUCH A BRAKING DEVICE

CROSS-REFERENCE TO RELATED APPLICATIONS

This application claims priority to German application 102018200730.6, filed Jan. 17, 2018, which is hereby incorporated by reference in its entirety.

FIELD OF THE INVENTION

The present invention relates a braking device for a movable door leaf, having an electric braking motor, operated as a generator, for generative damping of the movement of the door leaf, the motor shaft of which is coupleable with the axis of rotation of the door leaf by means of a transmission arrangement. It further relates to a door closer, having a rotatable door closer axle, coupleable with a door leaf, cooperating with a mechanical energy storage device, and such a braking device.

A braking device of the above-mentioned type is known, for example, from DE 10 2015 200 284 B3. In this known braking device being associated with a door closer, the braking effect of the braking motor is controlled by a pulse width modulated short circuit of the motor windings. If the door leaf is opened or closed, said braking motor dampens the leaf movement. At the same time, a generator winding in the braking motor or a separate generator generates the electrical energy required to supply a control unit serving to control the damping of the door leaf. The door leaf is connected, for example, by means of a fitting, comprising a sliding rail with lever or a linkage or the like, with the output shaft of the door closer, which is connected with the braking motor/generator or the braking motor and the separate generator by means of a fixed gear ratio.

However, in such a conventional brake device to date with a braking motor/generator or braking motor and separate generator, connected with the axis of rotation of the door leaf by means of a fixed gear ratio, there exists the disadvantage that the speed of the motor shaft of the braking motor/generator or the speed of the braking motor and separate generator rotates or changes proportionally to the speed of the door leaf or its axis of rotation. Therefore, the speed of the door leaf or its axis of rotation may vary within a wide range. If the door leaf is manually opened particularly quickly, possible opening times, from an opening angle of 0° to an opening angle of 90°, may be one second. If the braking device dampens the closing movement of the mechanical storage device of the door closer, comprising, for example, a spring unit, very strongly when closing the door leaf, closing times from an opening angle of 90° to an opening angle of 0° of up to 90 seconds can be achieved. As a result, the braking motor and the transmission unit must be designed for a relatively large speed range. For example, even at low leaf speed, sufficient damping must be achieved. This is the easier to implement, the larger the gear ratio is. However, this means that the engine speed in the above example is higher by a factor of 90 at a high leaf speed, which results in considerable noise.

For example, if the generator is designed to deliver, for example, 2V at the lower leaf speed, it will produce up to 180V at the high leaf speed according to the example above. A charging circuit, in particular one provided for supplying power to a control unit, serving to control and/or regulate the braking motor, must therefore be designed for this large voltage range.

In the field of automotive technology as well as two-wheeler or moped technology, continuously variable transmissions (CVT) are also known, which are generally controlled electronically or hydraulically.

SUMMARY OF THE INVENTION

The aim according to the invention is to propose a braking device as well as a door closer of the above-mentioned type in which the previously mentioned problems have been eliminated. In the simplest and most cost-effective manner, it is to be achieved here, in particular, that the braking motor, and optionally the separate generator, can be driven at a speed that is at least substantially independent of the speed of the door leaf or its axis of rotation.

This object is achieved according to the invention by a braking device with the features of claim 1 as well as a door closer with the features of claim 17. Preferred embodiments of the braking device according to the invention as well as the door closer according to the invention result from the dependent claims, the present description, and the drawing.

The braking device according to the invention for a movable door leaf comprises an electric braking motor, operated as a generator, for generative damping of the movement of the door leaf, the motor shaft of which is coupleable with the axis of rotation of the door leaf, and a control unit for controlling and/or regulating the electric braking motor. Between the axis of rotation of the door leaf and the motor shaft of the electric braking motor and/or between the axis of rotation of the door leaf and a separate generator, serving as a power supply of the control unit, there is provided a continuously variable transmission unit, which is controlled and/or regulated by means of a preferably purely mechanical control such that the motor shaft of the electric braking motor and/or the separate generator can be driven at a rotational speed which is at least substantially independent of the rotational speed of the rotational axle of the door leaf. At the same time, the braking motor may be designed as a generator for supplying power to a control unit provided for controlling the braking motor and be provided, for example, with a generator winding. Alternatively, a separate generator may be provided, which can then be driven, in particular, by means of the same transmission arrangement as the braking motor.

Due to the embodiment according to the invention, it is ensured in a relatively simple and correspondingly inexpensive manner that the braking motor, and optionally the separate generator, can be driven at a speed that is at least substantially independent of the speed of the door leaf or its axis of rotation. This is achieved in a particularly simple manner if the continuously variable transmission unit according to the invention can be controlled and/or regulated by means of a purely mechanical control.

Here, according to a preferred practical embodiment of the braking device according to the invention, the continuously variable transmission unit comprises a circumferential belt, extending between a drive shaft and an output shaft of the continuously variable transmission, the belt being guided by means of two bevel gears, fixedly rotatably connected to the drive shaft, and/or two bevel gears, fixedly rotatably connected to the to the output shaft, wherein, for the mechanical control of the ratio of the continuously variable transmission unit, with the belt maintained tensioned, the axial distance between the two bevel gears of at least one bevel gear pair, fixedly rotatably connected to the drive shaft or the output shaft, respectively, and thus the radial distance of the belt portion, looping around the respective bevel gear pair, from the drive shaft or the output shaft, respectively, is continuously variable.

With the radial distance of the belt portion, looping round the respective bevel gear pair, from the drive shaft or the output shaft, respectively, the ratio of the continuously variable transmission changes accordingly. By this radial distance of the belt portion, looping around the respective bevel gear pair, from the drive shaft and the output shaft being continuously variable by the axial distance between the two bevel gears of the respective bevel gear pair, the ratio of the continuously variable transmission unit is continuously variable in a purely mechanical manner.

Advantageously, the belt is herein suitably held under tension by a spring-loaded belt tensioning pulley.

According to a preferred practical embodiment of the braking device according to the invention, at least one mass that is put in rotation with the drive or output shaft is provided, which is radially displaceable by the centrifugal force acting on it and which is connected in such a manner with at least one bevel gear of a bevel gear pair, which is relatively displaceable relative to the drive or output shaft of the continuously variable transmission unit and spring-loaded into an initial position, that the axially displaceable bevel gear is displaceable from its initial position by the centrifugal force acting on the mass against the spring force for varying the axial distance between the two bevel gears of the bevel gear force.

The control of the axial position of at least one bevel gear of a respective bevel gear pair with axially continuously variable distance is thus accomplished by means of the centrifugal force that acts on at least one mass put in rotation along with the drive or output shaft. Here, the respective bevel gear is moved from its initial position against the spring force, whereby the axial distance between the two bevel gears of the respective bevel gear pair, and thus the radial distance of the belt portion, looping around the respective bevel gear pair belt, from the drive or output shaft changes accordingly.

The centrifugal force acting on a respective mass is proportional to the square of the rotational speed of this mass or the rotational speed of the drive or output shaft of the continuously variable transmission unit. Since the centrifugal force acting on a respective mass increases quadratically with increasing angular velocity of the drive or output shaft of the continuously variable transmission is larger, the respective mass is displaced radially outward, whereby a respective axially displaceable bevel gear is displaced from its initial position and the spring unit acting on this bevel gear is tensioned. Here, the axial distance between the two bevel gears of the respective bevel gear pair changes until an equilibrium between the centrifugal force acting on the respective mass and the acting spring unit acting on a respective axially displaceable bevel gear is achieved. As a result, the braking motor, and optionally a separate generator, are driven by means of the continuously variable transmission unit according to the invention, which in this case is purely mechanically controlled or regulated, with a rotational speed at least substantially independent of the speed of the door leaf or its axis of rotation.

A respective mass is advantageously radially displaceably guided by a guide tube, which is rotatably fixedly connected to the drive or output shaft of the continuously variable transmission unit.

According to a simple practical embodiment of the braking device according to the invention, a respective bevel gear, axially displaceable relative to the drive or output shaft of the continuously variable transmission, is coupled with a respective mass by means of a cable.

Here, the cable be guided between a respective bevel gear, axially displaceable relative to the drive or output shaft of the continuously variable transmission, and a respective mass associated therewith by means of at least one deflection roller.

To optimize the mechanical control of the ratio of the continuously variable transmission unit, the deflection roller advantageously has a radius that is variable over its circumference.

According to an advantageous alternative embodiment of the braking device according to the invention, a respective bevel gear, axially displaceable relative to the drive or output shaft of the continuously variable transmission, is coupled with a respective mass by means of a lever arrangement.

A further preferred practical embodiment of the braking device according to the invention is characterized in that a respective bevel gear, axially displaceable relative to the drive or output shaft of the continuously variable transmission, of at least one bevel gear pair with axially continuously variable distance is designed as a ring gear with a conical jacket, which is spring-loaded into an initial position, in which it abuts with its open side against a wall that is rotationally fixedly as well as axially fixedly connected with the drive or output shaft, or has a minimum distance from this wall, and a respective mass, arranged between the ring gear and the wall, is displaceably guided along the wall by the spring-loaded ring gear, abuts against the inside of the conical jacket of the ring gear, on the one hand, and abuts against the wall, on the other hand.

If a respective mass is displaced radially outward due to the centrifugal force acting on it, the ring gear is displaced from its initial position against the spring force acting on it due to the abutment of the mass against the inside of the conical jacket of the ring gear, axially displaceable relative to the drive or output axle. Thus, the axial distance of the two bevel gears of the respective bevel gear pair, and thus the radial distance of the belt portion, looping around the bevel gear pair belt, from the drive or output shaft changes again. As described above, this also changes the ratio of the continuously variable transmission again. Thus, in the present case, the control of the ratio of the continuously variable transmission unit is again accomplished in a purely mechanical manner.

According to a further advantageous practical embodiment of the braking device according to the invention, the bevel gear surfaces of the two bevel gears of a respective bevel gear pair with axially continuously variable distance have a course deviating from a linear course, preferably an at least substantially square course, to optimize the continuously variable transmission unit. With a corresponding design, in particular the dependence of the drive speed of the braking motor, and optionally of the separate generator, on the rotational speed of the axis of rotation of the door leaf can be further minimized.

According to an exemplary practical embodiment of the braking device according to the invention, the belt is guided by means of a bevel gear pair with axially continuously variable distance, rotatably fixedly connected to the drive shaft or the output shaft of the continuously variable transmission unit, on the one hand, and by means of a cylindrical belt pulley, rotatably fixedly connected to the output shaft or the drive shaft of the continuously variable transmission unit, on the other hand.

In this case, the ratio of the continuously variable transmission unit is continuously variable only via a bevel gear pair on the side of the drive shaft of the continuously variable transmission unit.

However, according to an alternative practical embodiment, the belt may also be guided by means of a first bevel gear pair, rotatably fixedly connected to the drive shaft of the continuously variable transmission unit, on the one hand, and by means of another bevel gear pair, rotatably fixedly connected to the output shaft of the continuously variable transmission unit, on the other hand, wherein at least one of the two bevel gear pairs is provided as bevel gear pair with axially continuously variable distance. In this case, a design is conceivable, for example, in which both bevel gear pairs are each designed as a bevel gear pair with axially continuously variable distance, and thus the transmission ratio of the continuously variable transmission unit is continuously variable on both, the side of the drive shaft and the side of the output shaft.

According to a further advantageous embodiment of the braking device according to the invention, both bevel gears of at least one bevel gear pair are each axially displaceable relative to the drive or output shaft of the continuously variable transmission, spring-loaded into an initial position, and, in order to vary the axial distance between the two bevel gears, are displaceable from an initial position against the spring force by means of a centrifugal force, applied by a mass, put into rotation along with the drive or output shaft.

In certain cases, it is also advantageous if the gear assembly, provided between the axis of rotation of the door leaf and the braking motor, also comprises a transmission unit with fixed ratio, arranged between the axis of rotation of the door leaf and the continuously variable transmission unit.

Alternatively or additionally, the transmission arrangement provided between the axis of rotation of the door leaf and the braking motor may also comprise a transmission unit with fixed ratio, arranged between the continuously variable transmission unit and the braking motor.

The door closer according to the invention, having a rotatable door closer axle, coupleable with a door leaf, cooperating with a mechanical energy storage device, and a braking device are characterized in that the braking device is designed in accordance with the braking device according to the invention.

Here, the braking device is preferably coupleable with the axis of rotation of the door leaf by means of the door closer axle.

The invention is explained in more detail below on the basis of exemplary embodiments and with reference to the drawings, in which the following are shown:

BRIEF DESCRIPTION OF THE DRAWINGS

FIG. 1 shows a schematic block diagram of an exemplary embodiment of a door closer according to the invention with an exemplary embodiment of a braking device according to the invention, FIG. 2 shows a schematic plan view of an exemplary embodiment of a continuously variable transmission unit of the braking device according to the invention, FIG. 3 shows a schematic side view of the continuously variable transmission unit according to FIG. 2, FIG. 7a shows a schematic representation of the minimum axial distance between the two bevel gears of the continuously variable transmission unit according to FIG. 2 and of the corresponding maximum radial distance of the belt portion, looping around the bevel gear pair, from the axle of the drive shaft at a minimum radial displacement of the associated masses.

FIG. 7b shows a schematic representation of the maximum axial distance between the two bevel gears of the continuously variable transmission unit according to FIG. 2 and of the corresponding minimum radial distance of the belt portion, looping around the bevel gear pair, from the axle of the drive shaft at a maximum radial displacement of the associated masses, FIG. 8 shows a diagram in which the speed of output shaft as a function of the speed of the drive shaft in a conventional transmission is compared with an exemplary embodiment with a mechanically controlled continuously variable transmission unit according to the invention of the brake device according to the invention, FIG. 9a shows a schematic representation of a bevel gear with a bevel gear surface, having a linear course, FIG. 9b shows a schematic representation of an exemplary embodiment of a bevel gear according to the invention with a bevel gear surface, having a quadratic course, deviating from a linear course, FIG. 10 shows a schematic representation of an exemplary embodiment of the continuously variable transmission unit of the braking device according to the invention, in which the belt is guided with axially continuously variable distance on both, the drive side and the output side, by means of a bevel gear pair each, and both bevel gears of the two bevel gear pairs are each axially displaceable relative to the drive or output shaft and are spring-loaded in an initial position.

DETAILED DESCRIPTION

Figure 4:
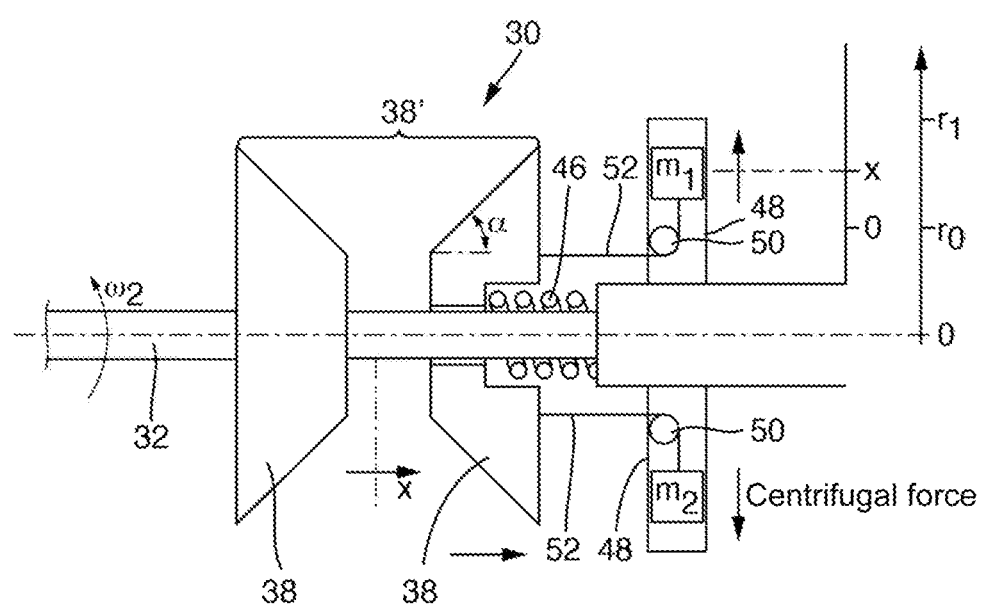
FIG. 4 shows a schematic representation of the mechanical control of the ratio of the continuously variable transmission unit according to FIG. 2.

FIG. 1 shows, in the form of a schematic block diagram, an exemplary embodiment of a door closer 10 according to the invention, having a rotatable door closer axle 16, which is coupleable to a door leaf 12 and interacts with a mechanical energy storage device 14, such as a spring unit, and an exemplary embodiment of a brake device 18 according to the invention.

In the present embodiment, the braking device 18 is coupleable with the door leaf 12 and its axis of rotation by means of the door closer axle 16 and a slide lever, a linkage 20, or the like. Between the door closer axle 16 and the mechanical energy storage device 14, a door closer transmission unit 22, comprising a cam or the like, may be provided.

The braking device 18 comprises an electric braking motor 24 operated as a generator, for generative damping of the movement of the door leaf 12, the motor shaft 26 of which is coupleable to the door leaf 12 or its axis of rotation by means of a gear assembly 28. At the same time, the braking motor 24 may be designed as a generator for supplying power to a control unit provided for controlling the braking motor 24 and be provided, for example, with a generator winding. Alternatively, a separate generator may be provided, which can then be driven, in particular, by means of the same transmission arrangement 28 as the braking motor 24.

The transmission assembly 28 comprises a continuously variable transmission unit 30, which is controlled and/or regulated by a purely mechanical control in such a manner that the motor shaft 26, and optionally a separate generator, can be driven with a speed $\omega_m$ that is at least substantially independent of the rotational speed of the axis of rotation of the door leaf 12 or the rotational speed of door closers axle 16.

As can be seen from FIGS. 2 to 13, the continuously variable transmission unit 30 of the various exemplary embodiments of the brake device 18 according to the invention in each case comprises a belt 36, extending circumferentially between a drive shaft 32 and an output shaft 34 of the continuously variable transmission unit 30, guided by means of two bevel gears 38, rotatably fixedly connected with the drive shaft 32, and/or two bevel gears, rotatably fixedly connected with the output shaft 34. For the mechanical control of the ratio of the continuously variable transmission unit 30 here, with the belt 36 kept tensioned, the axial distance between the two bevel gears 38 of at least one bevel gear pair 38', rotatably fixedly connected with the drive shaft 32 or the output shaft 34, and thus the radial distance $R_2$ of the belt portion, looping around the respective bevel gear pair 38', from of the axle of the drive shaft 32 or the output shaft 34 is continuously variable. As can be seen from FIG. 3, the belt 36 can in each case be kept tensioned by a belt tensioning pulley 44 being spring-loaded, for example, by a spring unit 42.

FIG. 2 to 5 show an exemplary embodiment of a continuously variable transmission unit 30 of the braking device 18 according to the invention, in which the belt 36 is guided by means of a bevel gear pair 38' with axially continuously variable distance, rotationally fixedly connected to the drive shaft 32 of the continuously variable transmission unit 30, on the one hand, and by means of a cylindrical belt pulley 54, rotationally fixedly connected to the output shaft 34 of the continuously variable transmission unit 30, on the other hand.

In this case, only one of the two bevel gears 38 of the bevel gear pair 38' with axially continuously variable distance relative to drive shaft 32 of the continuously variable transmission unit 30 is axially displaceable and spring-loaded into an initial position. To vary the axial distance between the two bevel gears, the axially displaceable bevel gear 38 is movable against the spring force out of its initial position by the centrifugal force acting on the at least two masses $m_1$, $m_2$, put into rotation along with the drive shaft 32. As can be seen in particular from FIG. 4, in the present case the right bevel gear 38, for example, of the bevel gear pair 38' is axially displaceable relative to the drive axle 32 and moveable out of its initial position against the force of a spring unit 46 by the centrifugal force acting on the masses $m_1$, $m_2$.

Figure 5:
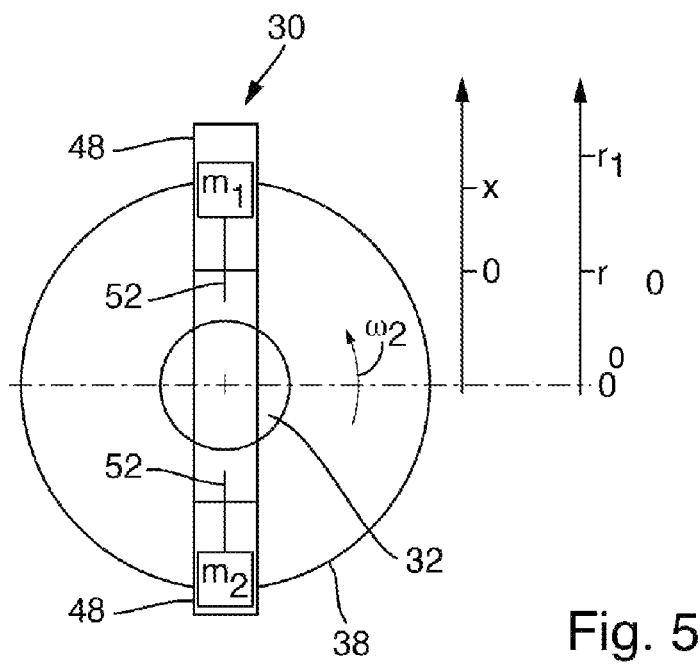
FIG. 5 shows a schematic frontal view of the bevel gear of the bevel gear pair of the continuously variable transmission unit of FIG. 2, axially displaceable relative to the drive shaft, with masses, associated with the axially displaceable bevel gear, in a respective guide tube.

As can be seen in particular from FIGS. 4 and 5, the masses $m_1$, $m_2$ in the present case, associated with bevel gear 38, axially displaceable relative to the drive shaft 32, guided radially slidably, for example, in a radial guide tube 48. rotationally fixedly connected to the drive shaft 32 of the continuously variable transmission unit 30. The associated masses $m_1$, $m_2$ axially displaceable relative to the drive shaft 32 bevel gear 38, in the present case are each coupled with the bevel gear 38 by means of a cable 52 guided around a deflection roller 50.

The mechanical control of the axial position of a respective bevel gear 38, axially displaceable relative to the drive shaft 32, is accordingly accomplished with the aid of centrifugal force, which acts on the masses $m_1$, $m_2$ acts and is proportional to the square of the rotational speed of these masses or the drive shaft 32. When the drive shaft 32 of the continuously variable transmission unit 30 rotates with the rotational speed $\omega_2$, the centrifugal force that acts on the each of the masses $m_1$ and $m_2$ at a relative radial displacement x of the masses with respect to their minimum deflection is $$F_{Z1/2} = m_{1/2} \omega_2^2 x.$$

The centrifugal force increases quadratically with increasing speed of rotation $\omega_2$ of the drive shaft 32 of the continuously variable transmission unit 30, that is, it is proportional to $\omega_2^2$, and displaces the masses $m_1$ and $m_2$ radially outward. At the same time, due to the corresponding displacement of the respective bevel gear 38, spring unit 46 spring-loading this bevel gear is tensioned. In the representation according to FIG. 4, the right bevel gear 38 is now displaced to the right against the spring force until an equilibrium between the spring force 46 $F_F$, generated by the spring unit, and the centrifugal force $F_Z$, acting on the masses $m_1$ and $m_2$, is established. The following relationship holds for this equilibrium:

$$F_F = c(x+x_0) = F_Z = m\omega_2^2(x+r_0), \ m = m_1 + m_2,$$

where this relationship is true for $0 \leq x \leq r_1 - r_0$ and m is the sum of the masses $m_1$ and $m_2$, c is the spring stiffness of the spring unit 46, $cx_0$ is the spring bias of the spring unit 46, x is the radial displacement of a respective mass $m_1$, $m_2$ with respect to their initial position, $r_0$ is the radial distance of a respective mass $m_1$, $m_2$, occupying its initial position, to the axle of the drive shaft 32, and $r_1$ is the radial distance of the masses $m_1$, $m_2$ to the axle of the drive shaft 32 at their maximum displacement.

For $$m\omega_2^2(x+r_0) > c(x+x_0)$$

or $$\omega_2 > \sqrt{\frac{c(x+x_0)}{m(x+r_0)}} = \omega 20$$

the bevel gear 38, being axially displaceable relative to the drive shaft 32, is displaced by the path x to the right in the representation according to FIG. 4, wherein this path x is determined by the following relationship:

$$x = \frac{m\omega_2^2 r_0 - cx_0}{c - m\omega_2^2}.$$

Figure 6:
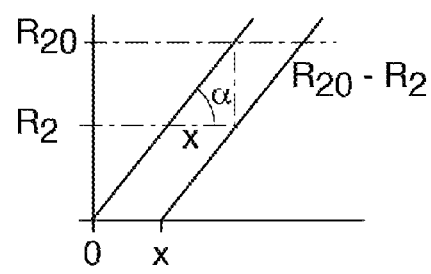
FIG. 6 shows a diagram showing the dependence of the radial distance of the belt portion, looping around the bevel gear pair of the continuously variable transmission unit according to FIG. 2, from the axle of the drive shaft on the displacement of the axially displaceable bevel gear.

If $\alpha$ is the slope of the axially displaceable bevel gear 38, the maximum radial distance $R_{20}$ of the belt portion, looping around the bevel gear 38, from the axle of the drive shaft 32 of the continuously variable transmission unit 30 decreases, as per the representation according to FIG. 6, to the radial distance $R_2$, determined by the relationship $$R_2 = R_{20} - x \tan x.$$

Since the belt 36, on its left side in FIG. 2, runs on a bevel gear 38, axially fixedly connected to the drive shaft 32, with the same slope $\alpha$, the radial distance $R_{20}$ decreases only by half so that, the relationship holds for the resulting reduced radial distance $R_2$ of belt portion, looping around the respective bevel gear pair 38', from the axle of the drive shaft:

$$R_2 = R_{20} - 1/2 x \tan x$$

With a radial displacement of the masses $m_1$ and $m_2$ radially outward by the path $x = r_1 - r_0$, the masses $m_1$ and $m_2$ abut against the end of the guide tube 48. Until such abutment of the masses $m_1$ and $m_2$ against the end of the guide tube 48, it applies that, with increasing x, the radial distance $R_2$ belt portion, looping around the respective bevel gear pair 38', from the axle of the drive shaft 32 of the continuously variable transmission unit 30 decreases. The respective excess belt length is compensated by the spring-loaded belt tensioning pulley 44. The spring constant of this spring unit 42, spring-loading the belt tensioning pulley 44, is taken into consideration in the aforementioned spring stiffness c.

For example, considering a concrete example with the following values,

| | |
|---|---|
| $m_1 + m_2 = m$ | 0.07 kg |
| r0 | 0.005 m |
| r1 | 0.011 m |
| c | 3000 N/m |
| x0 | 0.0007 m |
| R20 | 0.01 m |
| R30 | 0.01 m |
| $\alpha$ | 65° | according to FIG. 7a, for a minimum axial displacement of the respective bevel gear 38 of x=0 mm, a radial distance $R_2$ belt portion, looping around the respective bevel gear pair 38', from the axle of the drive shaft 32 of 10 mm and, according to FIG. 7b, at a maximum axial displacement of the respective bevel gear 38 by x=6 mm, there results a radial distance $R_2$ of the belt portion, looping around the respective bevel gear pair 38', from the axle of the drive shaft 32 of 3.6 mm. For the present example, the following radial distances $R_2$ of the belt portion, looping around respective bevel gear pair 38', from the drive shaft 32, thus result:

$$R_2(x=0 \text{ mm}) = 10 \text{ mm}$$

$$R_2(x=6 \text{ mm}) = 3.6 \text{ mm}.$$

The resulting ratio SL of the continuously variable transmission unit 30 according to the invention can be taken from FIG. 8, in which the rotational speed $n_3$ of the output shaft 34 is shown above the speed $n_2$ of the drive shaft 32 of the continuously variable transmission unit 30.

For $$n_2 < 740 \frac{1}{\min},$$

the force of the spring unit 46 spring-loading the axially adjustable bevel gear 38 in question in its initial position is greater than the centrifugal force so that x=0 is true. The continuously variable transmission unit 30, in this case, behaves like a conventional transmission with the ratio SL' (cf. FIG. 8), for which the following applies:

$$n_3 = \frac{R_{20}}{R_{30}} n_2,$$

with
$R_{20}$=radius of a respective bevel gear 38
$R_{30}$=radius of the belt pulley 54
For $$740 \frac{1}{\text{mm}} \leq n_2 < 2275 \frac{1}{\text{mm}},$$

the centrifugal force greater than the force of the spring unit 46, spring-loading the axially displaceable bevel gear 38. The masses $m_1$ and $m_2$ move radially outward and reduce the radial distance $R_2$ of the belt portion, looping around the bevel gear pair 38' with axially variable distance, with respect to the radius $R_{20}$ of a respective bevel gear 38, so that the following relationship holds for the rotational speed $n_3$ of the output shaft 34 of the continuously variable transmission unit 30:

$$n_3 = \frac{R_{20} - \frac{1}{2} x \tan \alpha}{R_{30}} n_2.$$

At a speed $n_2$ of the drive shaft 32 of the continuously variable transmission unit 30 of $$2275 \frac{1}{\text{mm}},$$

the two masses $m_1$ and $m_2$ abut against the ends of the guide tube 48 so that x no longer changes. The continuously variable transmission unit 30 now behaves like a conventional transmission, but with a smaller reduction, which is determined by the following relationship:

$$n_3 = \frac{R_{20} - (r_1 - r_0)\tan\alpha}{R_{30}} n_2.$$

Overall, the continuously variable transmission unit 30 in the present embodiment thus reduces the dynamic response at the output by a factor of 3.

Starting at a speed $n_2$ of about $$1000 \frac{1}{\min}$$

up to about $$3000 \frac{1}{mm}$$

at the input or the drive shaft 32, the speed $n_3$ at the output or the output shaft 34 of the continuously variable transmission unit 30 is substantially constant, that is, at least substantially independent of the speed of the drive shaft 32 of the continuously variable transmission unit 30.

An optimization of this continuously variable transmission unit 30 can be achieved, as shown in FIG. 9, for example, if the bevel gear surfaces of the two bevel gears 38 of a respective bevel gear pair 38' with axially continuously variable distance deviate from a linear course (cf. FIG. 9a), preferably having an at least substantially quadratic course (cf. FIG. 9b). The correspondingly optimized transmission behaviour of the continuously variable transmission unit 30 is shown by the curve $SL_{opt}$ in FIG. 8.

For example an embodiment of the continuously variable transmission unit 30 of the brake device 18 according to the invention is conceivable as well in which, in the embodiment of FIG. 4, the left bevel gear 38 of the bevel gear pair 38' is also axially displaceable relative to the output shaft 32 of the continuously variable control unit 30 and is spring-loaded by a spring unit 46 in an initial position, wherein the axial displacement of the bevel gear 38 is again controlled purely mechanically by means of the centrifugal force acting on the masses $m_1$, $m_2$. The design in question thus corresponds to that for the other bevel gear 38 of the bevel gear pair 38'.

Such an embodiment with two of the continuously variable transmission unit 30 relative to the drive shaft 32 brings along with it the two advantages, with respect to a variant with only one axially displaceable bevel gear, wherein the belt 36 does not move axially, while, in the first embodiment, the belt moves axially by the path x/2, and, in this second embodiment, the reduction is twice as big, wherein the rotational speed $n_3$ of the output shaft 34 of the continuously variable transmission unit 30 is determined by the following relationship:

$$n_3 = \frac{R_{20} - x\tan\alpha}{R_{30}}.$$

FIG. 10 shows a further exemplary embodiment of the continuously variable transmission unit 30 of the brake device 18 according to the invention, in which the belt 36 is guided, on both the drive side and the output side, by means of a bevel gear pair 38' each, with axially continuously variable distance, and both bevel gears 38 of the two respective bevel gear pairs 38' are axially displaceable relative to the drive or output shaft 32 or 34, respectively, of the continuously variable transmission unit 30 and spring-loaded, in an initial position, by a respective spring unit 46.

In the present embodiment, the two bevel gears 38 on the output side of the continuously variable transmission unit 30 have the same dimensions as those on the drive side. Their axial position is controlled by the two associated spring units 46, for example, provided as return springs, and by the belt tension. If the centrifugal force acting on the respective masses pulls apart the two bevel gears 38 on the drive side of the continuously variable transmission unit 30, then the two spring units or return springs 46 on the output side of the continuously variable transmission unit 30 push the bevel gears 38 together by the same axial path x. The previously provided belt tensioning pulley can be omitted here. The following applies for the reduction in the present case:

$$n_3 = \frac{R_{20} - x\tan\alpha}{R_{30} + x\tan\alpha} n_2.$$

Figures 11A, 11B:
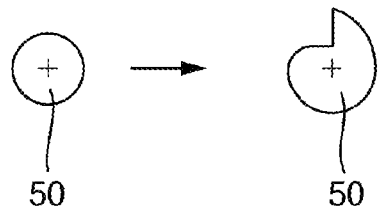
FIG. 11a shows schematic diagram of an exemplary cylindrical deflection roller of the braking device according to the invention.
FIG. 11b shows a schematic representation of a modified exemplary deflection roller of the braking device according to the invention, having a variable radius over its circumference.

For further optimization of the ratio of the continuously variable transmission unit 30, a deflection roller 50 may be provided, for example, as shown in FIG. 11, having a radius that is variable over its circumference.

Figures 12A, 12B:
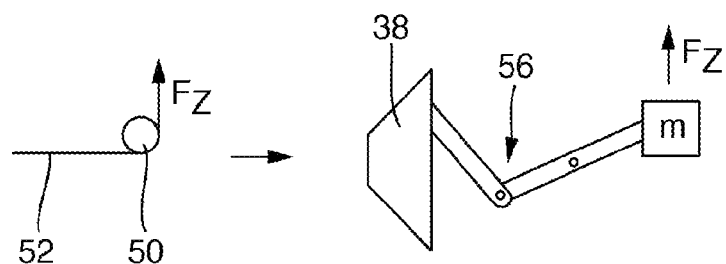
FIG. 12a shows a schematic representation of an exemplary coupling of a respective axially displaceable bevel gear of the braking device according to the invention with a respective mass by means of a cable, guided around a deflection roller.
FIG. 12b shows a schematic representation of an alternative exemplary coupling of a respective axially displaceable bevel gear of the braking device according to the invention with a respective mass by means of a lever arrangement.

As can be seen from FIG. 12, a lever assembly 56 may be provided, for example, instead of a cable 52, guided around a deflection roller 50, for coupling a respective axially displaceable bevel gear 38 of the continuously variable transmission 80 with a respective mass $m_1$, $m_2$.

Figure 13:
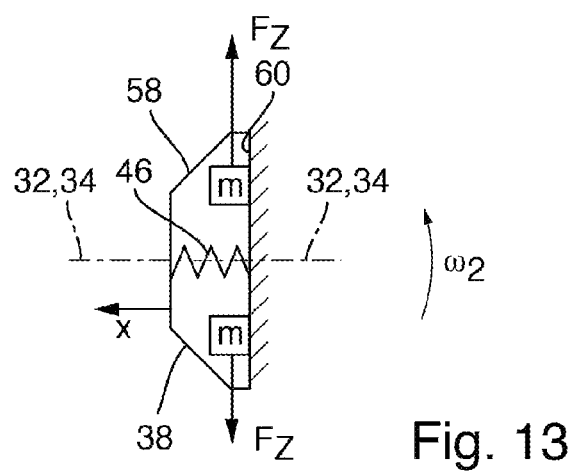
FIG. 13 shows a schematic representation of a bevel gear, axially adjustable relative to the drive or output axle, of a further exemplary embodiment of the continuously variable drive unit of the braking device according to the invention, in which the bevel gear is designed as a ring gear and the associated masses are radially displaceable along a wall, that is rotationally fixedly as well as axially fixedly connected to the drive or output axle, respectively.

FIG. 13 shows a further exemplary embodiment of a bevel gear, which is axially displaceable relative to the drive or output axle 32 or 34 of the continuously variable transmission unit 30 and which has a displacement that is mechanically controlled by the centrifugal force.

In this case, a respective bevel gear 38, axially displaceable relative to the drive or output shaft 32 or 34 of the continuously variable transmission 30 is embodied as a ring gear with a conical jacket 58, which is spring-loaded into an initial position by a spring unit 46, in which it abuts with its open side against a wall 60, which is both, rotationally fixedly and axially fixedly, connected with the drive or output shaft 32 or 34, or has a minimum distance from this wall 60. In addition, at least two masses m are arranged between the ring gear 38 and the wall 60 such that a respective mass m abuts against the inside of the conical jacket 58 of the ring gear 38, on the one hand, and abuts against the wall 60, on the other hand, by the spring-loaded ring gear 38 and is guided radially displaceably along the wall 60.

When the speed $\omega_2$ of the drive shaft 32 of the continuously variable transmission unit 30 increases, the masses m move radially outward along the wall 60 and push the ring gear 38 away from the wall 60 against the force of the spring unit 46, or to the left in the representation according to FIG. 13.

As can be seen from FIG. 1, the gear assembly 28 of the brake device 18 according to the invention may also comprise, for example, a transmission unit 62 with fixed ratio, arranged between the rotational axle of the door leaf 12 and the door closer axle 16 and the continuously variable transmission unit 30, and/or transmission unit 64 with fixed ratio,

LIST OF REFERENCE SYMBOLS

10 Door closer
12 Door leaf
14 Mechanical energy storage device
16 Door closer axle
18 Braking device
20 Slide lever, linkage
22 Door closer transmission unit
24 Braking motor
26 Motor shaft
28 Transmission arrangement
30 Continuously variable transmission unit
32 Drive shaft
34 Output shaft
36 Belt
38 Bevel gear
38' Bevel gear pair
42 Spring unit
44 Belt tensioning pulley
46 Spring unit
48 Guide tube
50 Deflection roller
52 Cable
54 Belt pulley
56 Lever arrangement
58 Jacket
60 Wall
62 Transmission unit with fixed ratio
64 Transmission unit with fixed ratio
$F_F$ Spring force
$F_Z$ Centrifugal force
$R_2$ Radial distance of the belt portion, looping around a respective bevel gear pair, from the axle of the drive or output shaft of the continuously variable transmission unit
$R_{20}$ Radius of a respective bevel gear or maximum radial distance of a belt portion, looping around a respective bevel gear bevel gear pair belt, from the axle of the drive shaft of the continuously variable transmission unit
SL Ratio of the continuously variable transmission unit
$SL_{opt}$ Optimized ratio of the continuously variable transmission unit
m Mass
$m_1$ Mass
$m_2$ Mass
$\omega_1, n_1$ Rotating speed of the door closer axle
$\omega_2, n_2$ Rotating speed of the drive shaft of the continuously variable transmission unit
$\omega_3, n_3$ Rotating speed of the output shaft of the continuously variable transmission unit
$\omega_m$ Rotating speed of the motor shaft

The invention claimed is:

1. A braking device (18) for a movable door leaf (12), having an electric braking motor (24), operated as a generator, for generative damping of the movement of the door leaf 12), a motor shaft (26) of which is coupleable with an axis of rotation of the door leaf (12) by means of a transmission arrangement (28), and a control unit for controlling and/or regulating the electric brake motor (24), wherein, between the axis of rotation of the door leaf (12) and the motor shaft (26) of the electric braking motor (24) and/or between the axis of rotation of the door leaf (12) and a separate generator, serving as a power supply of the control unit, there is provided a continuously variable transmission unit (30), which is controlled and/or regulated by means of a preferably purely mechanical control such that the motor shaft (26) of the electric braking motor (24) and/or the separate generator can be driven at a rotational speed which is at least substantially independent of the rotational speed ($\omega$m) of the rotational axle of the door leaf (12).

2. The braking device according to claim 1, wherein the motor shaft (26) of the electric braking motor (24) and the separate generator are drivable by means of the same continuously variable transmission (30) or by means of separate continuously variable transmission.

3. The braking device according to claim 1, wherein the continuously variable transmission unit (30) comprises a circumferential belt (36), extending between a drive shaft (32) and an output shaft (34) of the continuously variable transmission (39), the belt being guided by means of two bevel gears (38), fixedly rotatably connected to the drive shaft (32), and/or two bevel gears, fixedly rotatably connected to the to the output shaft (34), wherein, for the mechanical control of the ratio of the continuously variable transmission unit (30), with the belt (36) maintained tensioned, the axial distance between the two bevel gears (38) of at least one bevel gear pair (38'), fixedly rotatably connected to the drive shaft (32) or the output shaft (34), respectively, and thus the radial distance ($R_2$) of the belt portion, looping around the respective bevel gear pair (38'), from the drive shaft (32) or the output shaft (34), respectively, is continuously variable.

4. The braking device according to claim 3, wherein the belt (36) is held under tension by a spring-loaded belt tensioning pulley (44).

5. The braking device according to claim 3, wherein at least one mass ($m_1, m_2$) is provided, which is put in rotation along with the drive or output shaft (32 or 34), which is radially displaceable by the centrifugal force acting on it and which is connected to at least one bevel gear (38), axially displaceable relative to the drive or output shaft (32 or 34) of the continuously variable transmission unit (30) and spring-loaded into an initial position, of a bevel gear pair (38') with axially continuously variable distance, such that the axially displaceable bevel gear (38) is movable out of its initial position against the spring force by means of the centrifugal force acting on the mass ($m_1, m_2$) in order to vary the axial distance between the two bevel gears (38) of the bevel gear pair (38').

6. The braking device according to claim 5, wherein a respective bevel gear (38), axially displaceable relative to the drive or output shaft (32 or 34) of the continuously variable transmission (30), is coupled with a respective mass ($m_1, m_2$) by means of a cable (52).

7. The braking device according to claim 6, wherein the cable (52) is guided between a respective bevel gear (38), axially displaceable relative to the drive or output shaft (32 or 34) of the continuously variable transmission (30), and a respective mass ($m_1, m_2$) associated therewith by means of at least one deflection roller (50).

8. The braking device according to claim 7, wherein the deflection roller (50) has a variable radius over its circumference.

9. The braking device according to claim 5,
wherein a respective bevel gear (38), axially displaceable relative to the drive or output shaft (32 or 34) of the continuously variable transmission (30), of at least one bevel gear pair (38') with axially continuously variable distance is coupled with a respective mass ($m_1$, $m_2$) by means of a lever arrangement (56).

10. The braking device according to claim 1,
wherein a respective mass ($m_1$, $m_2$) is radially displaceable guided by a guide tube (48), which is rotatably fixedly connected to the drive or output shaft (32 or 34) of the continuously variable transmission unit (30).

11. The braking device according to claim 1,
wherein a respective bevel gear (38), axially displaceable relative to the drive or output shaft (32 or 34) of the continuously variable transmission (30), of at least one bevel gear pair (38') with axially continuously variable distance is designed as a ring gear with a conical jacket (58), which is spring-loaded into an initial position, in which it abuts with its open side against a wall (60) that is rotationally fixedly as well as axially fixedly connected with the drive or output shaft (32 or 34), or has a minimum distance from this wall (60), and a respective mass, arranged between the ring gear (38) and the wall (60), is displaceably guided along the wall (60) by the spring-loaded ring gear (38), abuts against the inside of the conical jacket (58) of the ring gear (38), on the one hand, and abuts against the wall (60), on the other hand.

12. The braking device according to claim 1,
wherein the bevel gear surfaces of the two bevel gears (38) of a respective bevel gear pair (38') with axially continuously variable distance has a course deviating from a linear course, preferably an at least substantially square course.

13. The braking device according to claim 1,
wherein the belt (36) is guided by means of a bevel gear pair (38') with axially continuously variable distance, rotatably fixedly connected to the drive shaft (32) or the output shaft (34) of the continuously variable transmission unit (30), on the one hand, and by means of a cylindrical belt pulley (44), rotatably fixedly connected to the output shaft (32) or the drive shaft (34) of the continuously variable transmission unit (30), on the other hand.

14. The braking device according to claim 1,
wherein the belt (36) is guided by means of a first bevel gear pair (38'), rotatably fixedly connected to the drive shaft (32) of the continuously variable transmission unit (30), on the one hand, and by means of another bevel gear pair (38'), rotatably fixedly connected to the output shaft (34) of the continuously variable transmission unit (30), on the other hand, and at least one of the two bevel gear pairs (38') is provided as bevel gear pair with axially continuously variable distance.

15. The braking device according to claim 1,
wherein both bevel gears (38) of at least one bevel gear pair (38') are each axially displaceable relative to the drive or output shaft (32 or 34) of the continuously variable transmission (30), spring-loaded into an initial position, and, in order to vary the axial distance between the two bevel gears (38), are displaceable from an initial position against the spring force by means of a centrifugal force, applied by a mass ($m_1$, $m_2$), put into rotation along with the drive or output shaft (32 or 34).

16. The braking device according to claim 1,
wherein the gear assembly (28), provided between the axis of rotation of the door leaf (12) and the braking motor (24), also comprises a transmission unit (62) with fixed ratio, arranged between the axis of rotation of the door leaf (12) and the continuously variable transmission unit (30).

17. The braking device according to claim 1,
wherein, the gear assembly (28), provided between the axis of rotation of the door leaf (12) and the braking motor (24), also comprises a transmission unit (64) with fixed ratio, arranged between the continuously variable transmission unit (30) and the braking motor (24).

18. A door closer (10) having a rotatable door closer axis (14), coupleable with a door leaf, cooperating with a mechanical energy storage device (12), and a braking device (16), wherein the braking device (18) is designed in accordance to claim 1.

19. The door closer according to claim 18,
wherein the braking device (18) is coupleable with the axis of rotation of the door leaf (12) by means of the door closer axle (16).

* * * * *